(12) United States Patent
Moe

(10) Patent No.: US 7,235,909 B2
(45) Date of Patent: Jun. 26, 2007

(54) ELECTROMAGNETIC MOTOR/GENERATOR

(76) Inventor: James Alfred Moe, 4803 Carolyn La., White Bear Lake, MN (US) 55110

( * ) Notice: Subject to any disclaimer, the term of this patent is extended or adjusted under 35 U.S.C. 154(b) by 242 days.

(21) Appl. No.: 10/923,913

(22) Filed: Aug. 23, 2004

(65) Prior Publication Data

US 2005/0023916 A1 Feb. 3, 2005

Related U.S. Application Data

(63) Continuation-in-part of application No. 10/394,901, filed on Mar. 21, 2003, now abandoned.

(51) Int. Cl.
*H02K 23/04* (2006.01)

(52) U.S. Cl. ............ 310/152; 310/154.29; 310/154.41; 310/154.28

(58) Field of Classification Search ................ 310/103, 310/152, 154.01, 154.06, 154.21–154.24, 310/154.27–154.29, 154.41, 154.43, 156.01, 310/156.07, 156.36–156.43
See application file for complete search history.

(56) References Cited

U.S. PATENT DOCUMENTS 3,205,415 A * 9/1965 Seki et al. ................ 335/210
3,906,268 A * 9/1975 de Graffenried ....... 310/154.46
4,459,500 A * 7/1984 Miyamoto ............. 310/154.21
4,559,463 A 12/1985 Kobayashi ................. 310/156
4,862,128 A * 8/1989 Leupold ..................... 335/306
5,013,951 A * 5/1991 Stadnik et al. ......... 310/156.07
5,280,209 A * 1/1994 Leupold et al. ........ 310/156.41
5,349,258 A * 9/1994 Leupold et al. ........ 310/154.43
6,060,804 A 5/2000 Fujita et al. .................. 310/81
6,098,456 A * 8/2000 Munck ........................ 73/275
6,841,910 B2 * 1/2005 Gery .......................... 310/103

FOREIGN PATENT DOCUMENTS

JP 04-251535 * 9/1992

OTHER PUBLICATIONS

Sears, et al. Internal Energy, *University Physics*, Sixth Edition,(pp. 349-350), 1982.

* cited by examiner

*Primary Examiner*—Dang Le
(74) *Attorney, Agent, or Firm*—Fredrikson & Byron, PA

(57) ABSTRACT

In some embodiments, an electromagnetic motor/generator may include one or more of the following features: (a) a frame, (b) a magnetic section having an upper magnet, a lower magnet, and a center magnet, coupled to the frame, and (c) at least one solenoid coupled to the frame and the center magnet.

18 Claims, 6 Drawing Sheets

ELECTROMAGNETIC MOTOR/GENERATOR

RELATED APPLICATION

This application is a continuation-in-part of and claims priority to U.S. application Ser. No. 10/394,901, filed Mar. 21, 2003 now abandoned titled "Permanent electro magnetic motor", the contents of which are herein incorporated by reference in their entirety.

FIELD

This disclosure relates to electromagnetic motors and generators.

BACKGROUND

Electric motors are everywhere. In homes, almost every mechanical movement is caused by an AC (alternating current) or DC (direct current) electric motor. A simple motor typically has six parts, an armature or rotor, a commutator, brushes, an axle, a field magnet, and a power supply of some sort. An electric motor utilizes the principles of magnets and magnetism: A motor uses magnets to create motion. The fundamental law of all magnets is that opposites attract and likes repel. With two bar magnets the north end of one magnet will attract the south end of the other. On the other hand, the north end of one magnet will repel the north end of the other (and similarly, south will repel south). Inside an electric motor, these attracting and repelling forces create rotational motion.

The axle holds the armature and the commutator. The armature is a set of electromagnets, typically three of them. The armature generally is a set of thin metal plates stacked together, with thin copper wire coiled around each of the three poles of the armature. The two ends of each wire (one wire for each pole) are soldered onto a terminal, and then each of the three terminals is wired to one plate of the commutator. The final piece of any electric motor is the field magnet. The motor body itself typically forms the field magnet plus curved permanent magnets. As discussed above, these prior electromagnetic motors require several parts adding to complexity and expense of the motor.

In operation, the armature is suspended within the motor body between the permanent magnets. With the power source attached to the electromagnet, the north end of the electromagnet would be repelled from the north end of the magnets and attracted to the south end of the magnets. The south end of the electromagnet would be repelled in a similar way. The electromagnet would turn to this position and then stop. It can be shown that this motion is simply due to the way magnets naturally attract and repel one another. In a typical electromagnetic motor, at the moment that this turn of motion completes, the polarity of the power supply can be switched and thus the field of the electromagnet flips. The magnetic field is flipped by changing the direction of the electrons flowing in the wire connected to the electromagnet. The flip causes the electromagnet to complete another turn. This process of flipping the polarity is continued at the end of each turn, causing the electric motor to spin. However, a power supply is required to magnetize the electromagnet to allow the electromagnet to spin. Therefore, in electromagnetic motors, power must be consumed to create power or perform work. Depending on the application, this can amount to a lot of power.

Presently magnetic motors have permanent magnets in outer field cores with electrical windings, or have permanent magnets in a center rotor with electrical coils driving the center rotor around as discussed above. Motors with outer field cores such as shown in U.S. Pat. No. 4,559,463 issued Dec. 17, 1985, to H. Kobayashi, have permanent magnets in an outer field core, with a double cage winding and permanent magnets attached to a center rotor which turns against an uneven outer field core. However, these motors require more electrical energy for more workable power. Further, present electromagnetic motors lose energy due to heat build up when the motor runs for extended periods of time.

It is desirable to have an magnetic motor with fewer electrical parts. It is also desirable to have an electromagnetic motor free from electrical winding, which are constantly turning on and off to make one full revolution for the motor which also requires additional power to perform more work.

SUMMARY

In some embodiments, an electromagnetic motor/generator may include one or more of the following features: (a) a frame, (b) a magnetic section having an upper magnet, a lower magnet, and a center magnet, coupled to the frame, and (c) at least one solenoid coupled to the frame and the center magnet.

In some embodiments, a method for manufacturing an electromagnetic motor/generator may include one or more of the following steps: (a) coupling an axle to a frame, (b) coupling a magnetic section having an upper magnet and a lower magnet to the axle, (c) coupling a center magnet to the frame between the upper magnet and the lower magnet, (d) coupling the center magnet to at least one solenoid, and (e) coupling the axle to a generator for producing electricity.

In some embodiments, a method for manufacturing a magnetic block may include one or more of the following steps: (a) coupling magnetically a first magnet having a north and a south pole to a second magnet having a north and south pole, (b) coupling magnetically the first magnet having a north and a south pole to a third magnet having a north and south pole, (c) coupling magnetically a fourth magnet having a north and a south pole to the second magnet, and (d) coupling magnetically a fourth magnet having a north and a south pole to the third magnet, wherein the poles of the magnets form an L shaped pressure leg.

In some embodiments a magnetic group may include one or more of the following steps: (a) a first magnet having a north and a south pole, the first magnet being magnetically coupled to a second magnet having a north and a south pole and magnetically coupled to a third magnet having a north and south pole, (b) a fourth magnet having a north and a south pole, the fourth magnet being magnetically coupled to the second magnet and magnetically coupled to the third magnet, and (c) wherein the poles of the magnets form an L shaped pressure leg.

In some embodiments a magnetic block may include one or more of the following steps: (a) a first magnet having a north and a south pole, (b) a second magnet having a north and a south pole, (c) a third magnet having a north and a south pole, (d) a fourth magnet having a north and a south pole, (e) wherein each magnet is adjacent to two other magnets to form the block having a center with 3 similar poles and one dissimilar pole.

DRAWINGS

DESCRIPTION OF VARIOUS EMBODIMENTS

Figure 1:
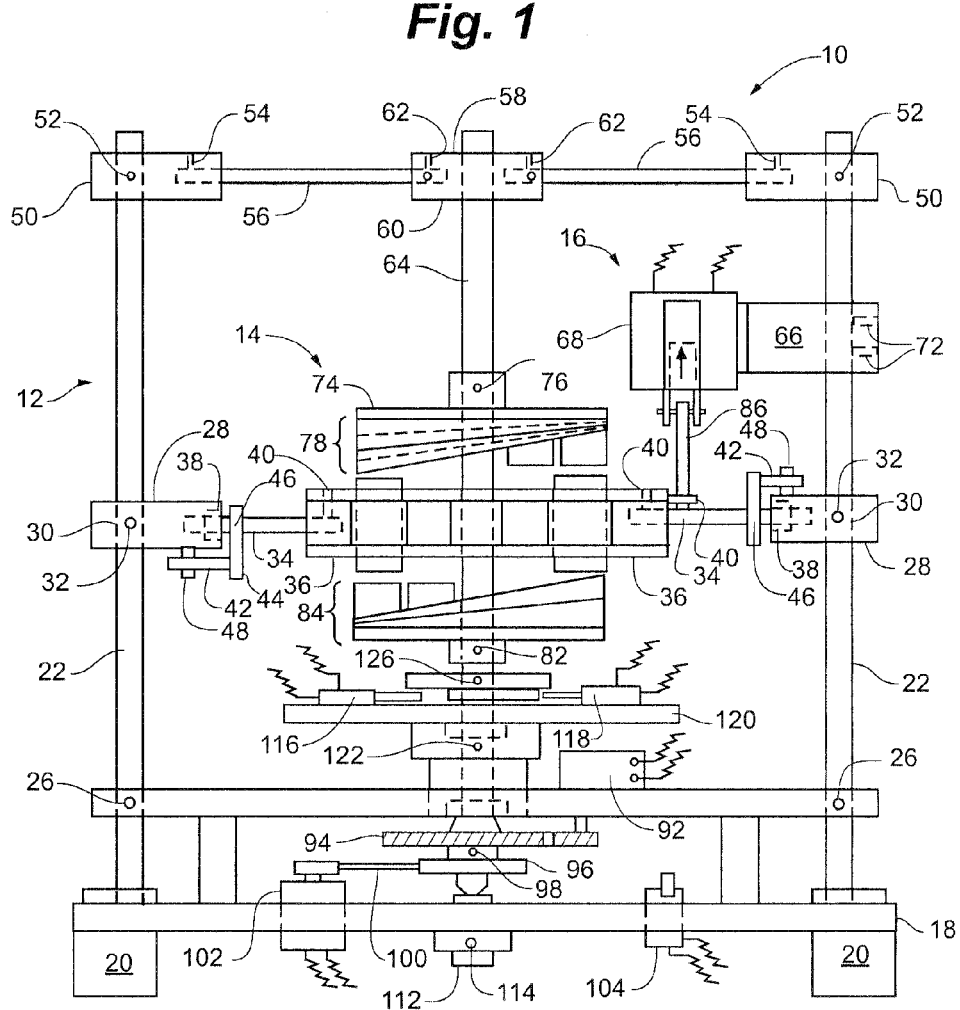
FIG. 1 shows a front profile view of a magnetic motor in an embodiment of the present teachings.

The following discussion is presented to enable a person skilled in the art to make and use the present teachings. Various modifications to the illustrated embodiments will be readily apparent to those skilled in the art, and the generic principles herein may be applied to other embodiments and applications without departing from the present teachings. Thus, the present teachings are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of the present teachings. Skilled artisans will recognize the examples provided herein have many useful alternatives and fall within the scope of the present teachings.

Figure 2:
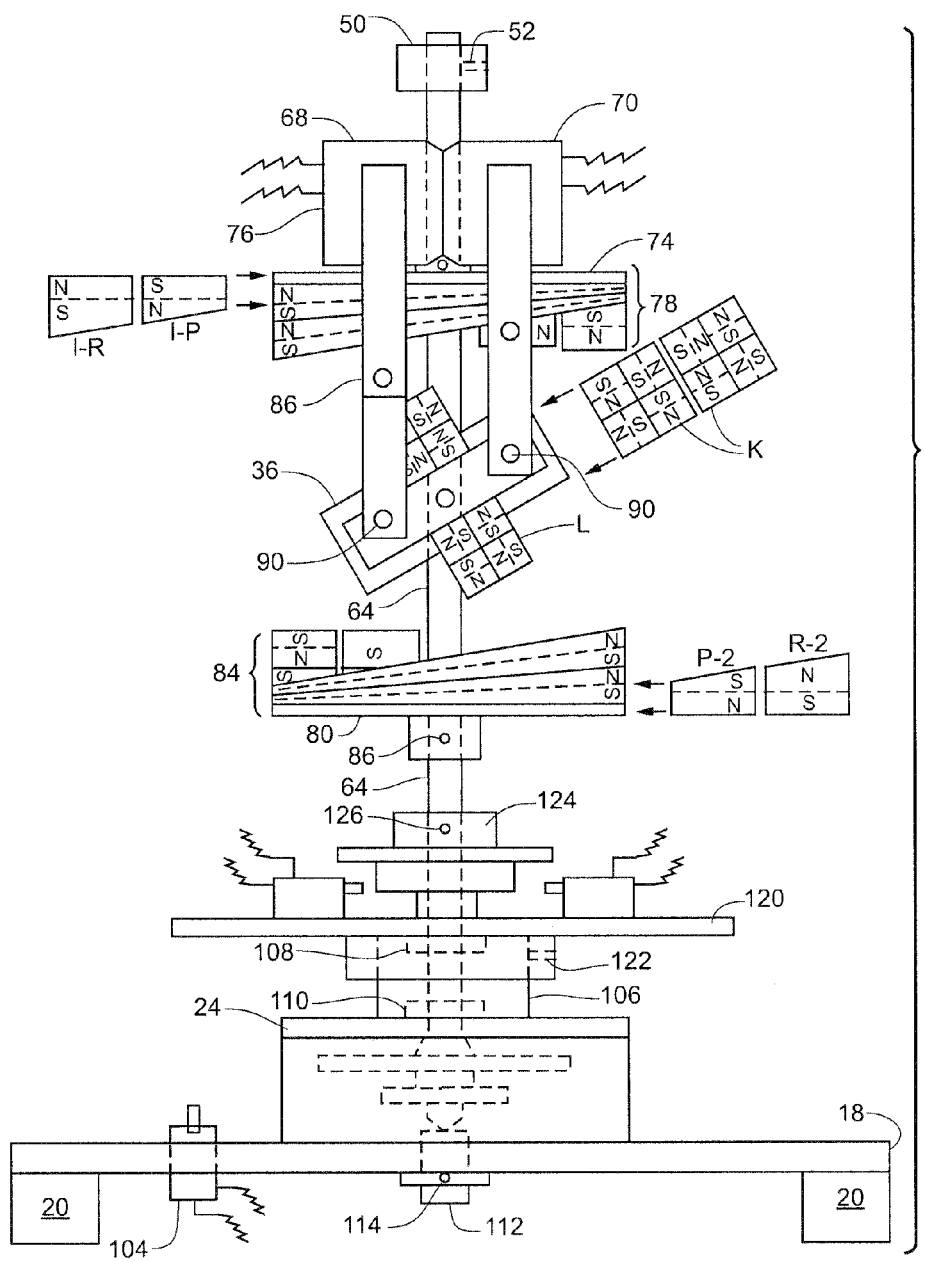
FIG. 2 shows a side profile view of a magnetic motor in an embodiment of the present teachings.

With reference to FIGS. 1 and 2, profile views of an electromagnetic motor/generator in an embodiment of the present teachings are shown. As illustrated, electromagnetic motor/generator 10 is comprised of frame 12, magnetic section 14, and electrical section 16.

Frame 12 can be comprised of base plate 18 which can be supported by legs 20. Base plate 18 is coupled to support rods 22, which extend through rod plate 24 and coupled thereto with locking pins 26. Support rods 22 can also extend through apertures 30 in end blocks 28, which latch to rods 22 with locking pins 32 to couple blocks 28 to rods 22. A set of rod axles 34 coupled to center magnet section 36 (described in detail below) with locking pins 40, engage bearings 38 within end blocks 28. A set of stop pins 42 used to stop the movement of cam bar 44 during operation can be coupled to rod axles 34 with locking pins 46 and to blocks 28 with pins 48 which are coupled to blocks 28 and stop pins 42.

End blocks 50 have apertures to allow rods 22 to pass through and held in place with set pins 52. Set pins 54 couple end blocks 50 to supports 56, which engage bearings 58 within center block 60 and held in place with pins 62. Center block 60 can have an aperture, which allows center axle 64 to pass through block 60. Solenoid block 66 couples solenoids 68 and 70 to frame 12 (discussed in more detail below) and also can have an aperture to allow rod 22 to pass through block 66 and is held in place with locking pin 72. Frame 12 can have most any shape, size and structure such as an enclosed frame which houses magnetic section 14 and electrical section 16 without departing from the spirit of the present teachings.

Magnetic section 14 can be comprised of top magnet base 74, which is held to center axle 64 by locking pin 76. Attached to top magnet base 74 is upper magnets 78. Upper magnets 78 can be attached to top magnet base 74 with an adhesive, however, other methods of attachment are contemplated such as bolting or clamping without departing from the spirit of the present teachings. Bottom magnet base 80 can be coupled to center axle 64 by pin 82. Lower magnets 84 are attached to base 80 similarly to upper magnets 78. Center magnet section 36 is located between upper magnets 78 and lower magnets 84 and is held in place as discussed above.

Electrical section 16 can be comprised of solenoids 68 and 70, which have activation arms 86 and 88 respectively. Activation arms 68 and 70 can be coupled to center magnet section 36 with lock pins 90. A small starter motor 92 can be coupled to a center gear wheel 94 to start it rotating and can be operably coupled to center axle 64 and wheel pulley 96 with a locking pin 98 to hold wheel pulley 96 to the center axle 64. Starter motor 92 starts the gear wheel 94 rotating and thus upper magnets 78 and lower magnets 84 rotating. This is helpful as magnets 78 and 84 will come to a rest where opposite polarities attract each other. Thus starter motor 92 assists in removing magnets 78 and 84 from this still position and provides initial power to the electromagnetic motor/generator. Belt 100 can be coupled from wheel pulley 96 to electrical generator 102, which is capable of producing power. An electrical switch 104 routes power from a power source, such as a battery or an AC wall outlet, to power micro switches 116 and 118. A center block 106 having a set of bearings 108 and 110 coupled to axle 64 is coupled to rod plate 24. The bottom of center axle 64 could rest on a screw head 112 to help reduce friction. Screw head 112 passes though base plate 18 and is held in place with lock pin 114. Micro switches 116 and 117 power solenoids 68 and 70 and can be coupled to holding plate 120 with locking pin 122 to hold round plate 120 in different positions. By changing the position of round plate 120 the timing of solenoids 68 and 70 can be controlled, which can increase or decrease the speed of rotation of axle 64. Timing block 124 engages one or both of micro switches 116 and 118 on each half rotation of axle 64 and is coupled to center axle 64 with locking pin 126.

Figure 3:
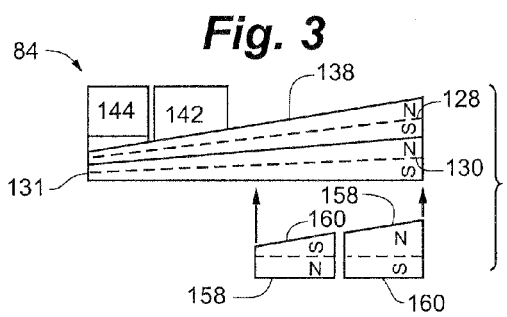
FIG. 3 shows a lower magnetic section in an embodiment of the present teachings.
Figure 4:
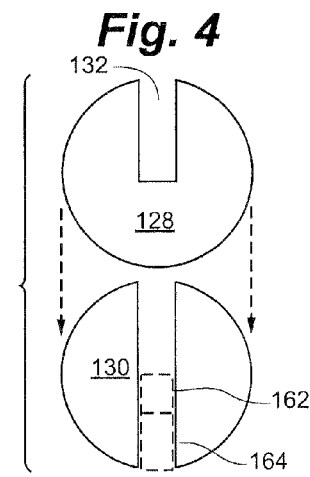
FIG. 4 shows a top profile view of round magnets in an embodiment of the present teachings.
Figure 5:
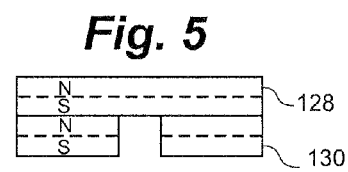
FIG. 5 shows a front profile view of round magnets in an embodiment of the present teachings.

With reference to FIG. 3, a lower magnetic section in an embodiment of the present teachings is shown. Round magnet wheels, 128 and 130 each have a north (N) and south (S) magnetic side. As illustrated magnets 128 and 130 can be one quarter inch thick and two and one half inches in diameter. However, it is fully contemplated magnets 128 and 130 can be any shape and size without departing from the spirit of the invention. Magnets 128 and 130 can be beveled at approximately a 12° angle to create a slope from one quarter inch thick to one sixteenth of a inch at bottom edge 131 of magnets 128 and 130. While the beveled angle is approximately a 12° angle, it is fully contemplated the beveled angle could be any angle without departing from the spirit of the invention. Magnet blocks 142 and 144 (discussed in more detail below) can be placed within opening 132 (FIGS. 4 and 5). Additionally magnet blocks 158 and 160 can be place within magnet wheels 128 and 130 at slots 162 and 164 (FIG. 4).

With reference to FIGS. 4 and 5, profile views of round magnets in an embodiment of the present teachings are shown. As is shown, round magnet 128 can have an opening 132 cut into it. Magnet 130 can be cut in half leaving two semi equal split half magnets. Wheel magnets 128 and 130 can then be placed together as shown in FIG. 5, where magnet 130 is placed on the bottom of the set, and magnet 128 can be placed on top in the set, having a north pole face showing when magnet wheels 128 and 130 are placed onto lower base 80 as shown in FIGS. 1 and 2.

Figure 6:
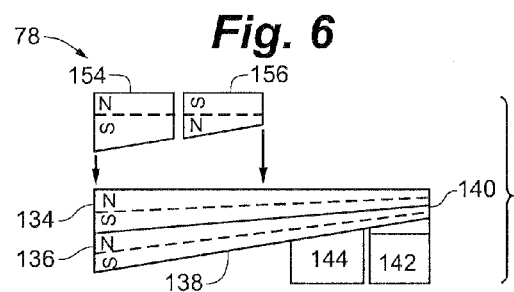
FIG. 6 shows an upper magnetic section in an embodiment of the present teachings.

With reference to FIG. 6, an upper magnetic section in an embodiment of the present teachings is shown. Round magnets 134 and 136 have a north and south pole and similar dimensions to magnets 128 and 130 with a beveled edge 138 extending to bottom edge 140. Round magnets 134 and 136 are cut similarly to magnets 128 and 130. Magnets 134 and 136 can then be placed together with a south pole face showing when placed on upper base 74. Magnet blocks 142 and 144 (discussed in more detail below) can be placed within an opening similar to opening 132 in wheel magnets 134 and 136. Additionally magnet blocks 154 and 156 can be placed within magnet wheels 134 and 136 at slots similar to slots 162 and 164 (FIG. 4). Bevel square block magnets 154 and 156 and bevel square magnet blocks 158 and 160 can be divided into equal pole halves having the same bevel as wheel magnets 128 and 130. Bevel square magnets 154, 156, 158, and 160 can be one half inch in length and one half inch in width, however, magnets 154, 156, 158, and 160 can be any size and shape without departing from the spirit of the invention.

Figure 7:
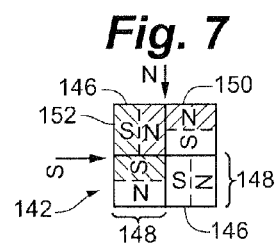
FIG. 7 shows an end view of a magnet block in an embodiment of the present teachings.
Figure 8:
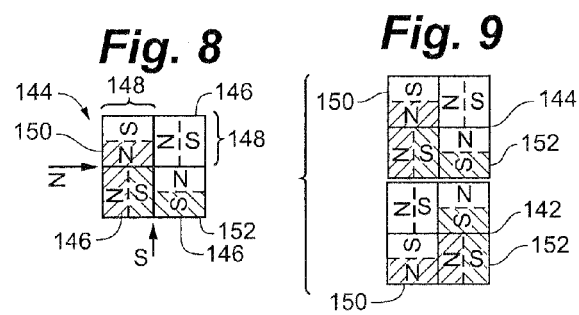
FIG. 8 shows an end view of a magnet block in an embodiment of the present teachings.

With reference to FIGS. 7 and 8, an end view of magnet blocks in an embodiment of the present teachings is shown. Magnet blocks 142 and 144 are comprised of 4 smaller magnets 146. Magnets 146 are placed together to achieve a desired result. The arrangement of smaller magnets 146 allows for the north and south poles to be on quarter sides 148 of magnet blocks 142 and 144. This is in contrast to a typical magnet, which has a north pole on one side and a south pole on another side. As illustrated, each magnet 146 can be one-quarter inch square and a half inch long, however, as discussed above, magnet 146 can be of any size and shape without departing from the spirit of the present teachings. Magnets 146 each have a north and south pole. Magnets 146 are placed together with each magnet 146 being 90 degrees from one another and thus each inner pole on magnet 146 will abut two poles on an adjacent magnet 146. As illustrated in FIG. 7, magnet block 142 can have three (S) south poles located in the center of the block, and one (N) north pole in the center of magnet block 142. This arrangement provides for one north 150 and one south L shaped pressure leg 152 located on magnet block 142. This pressure leg 150 and 152 arrangement creates a large north pole magnetic field and a large south pole magnetic filed relative to the remaining sides of magnet block 142, which will have a relatively lower and somewhat equal magnetic pressure. This larger magnetic field in pressure legs 150 and 152 is due to the combined magnetic fields of the adjacent north and south poles. With further reference to FIG. 8, magnet block 144 can have three (N) north poles located in the center of the block and one (S) south pole in the center of block 144. Similar to block 142, this arrangement provides for one north 150 and one south L shaped magnetic pressure leg 152.

Figure 9:
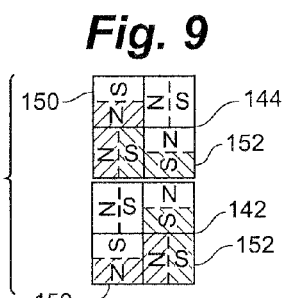
FIG. 9 shows a front view of a magnet block grouping in an embodiment of the present teachings.
Figure 10:
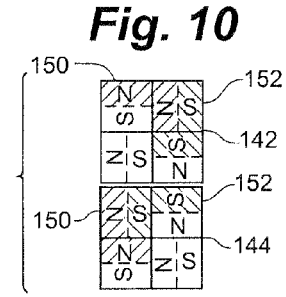
FIG. 10 shows a front view of a magnet block grouping in an embodiment of the present teachings.

With reference to FIGS. 9 and 10, a front view of a magnet block grouping in an embodiment of the present teachings is shown. Magnet blocks 142 and 144 can be combined as illustrated. In FIG. 9, block magnet 142 can be placed in front of block magnet 144 thus causing magnetic pressure legs 150 and 152 of blocks 142 and 144 to travel in different directions. Similarly, in FIG. 10, block magnet 142 can be placed behind block magnet 144, which also has magnetic pressure legs 142 and 144 of blocks 142 and 144 traveling in different directions. The combined magnet blocks are then placed together with wheel magnets 128 and 130 as shown in FIGS. 3 and 6.

Figure 11:
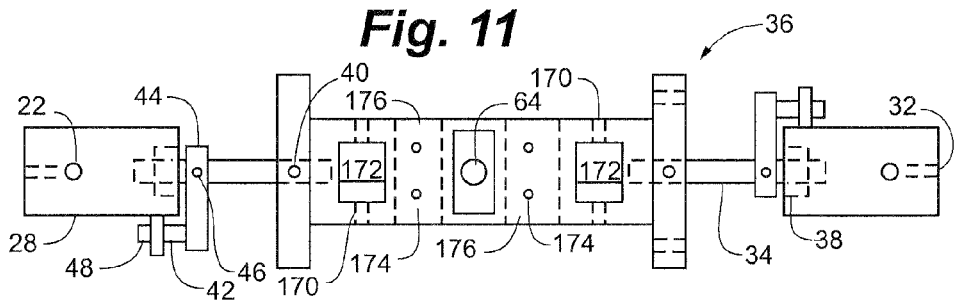
FIG. 11 shows a top profile view center magnet section in an embodiment of the present teachings.

With reference to FIG. 11, a top profile view of center magnet section in an embodiment of the present teachings is shown. As discussed above, center magnet section 36 can be placed between upper magnets 78 and lower magnets 84. Center section 36 can have a set of end blocks 28 with aperture 30 on the end to allow rod 22 to pass through. Locking pins 32 secure block 28 to support rod 22. Rod axles 34 in cross over bar 36 enter into bearings 38 on each end of end blocks 28. Pins 48 coupled to blocks 28 can have pins 42 one on each end of blocks 28 to stop the movement of cam bar 44.

Figure 12:
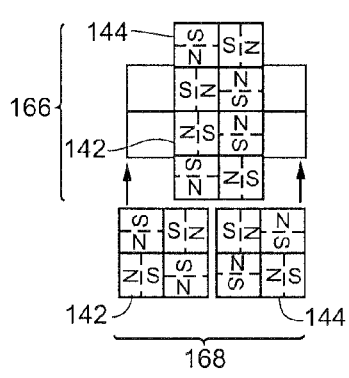
FIG. 12 shows a front view of a magnet grouping in an embodiment of the present teachings.
Figure 13:
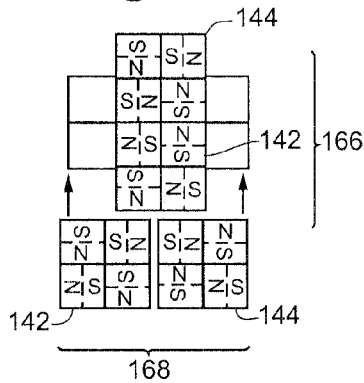
FIG. 13 shows a front view of a magnet grouping in an embodiment of the present teachings.

With reference to FIGS. 12 and 13, a front view of a magnet grouping in an embodiment of the present teachings is shown. Magnet blocks 142 and 144 can be placed together in magnet groups 166 and 168 and placed within center section 36. Magnet groups 166 can be held in aperture 172 within center section 36 with locking pins 170. Magnet groups 168 can be held in aperture 176 within center section 36 with locking pins 174.

Figure 14:
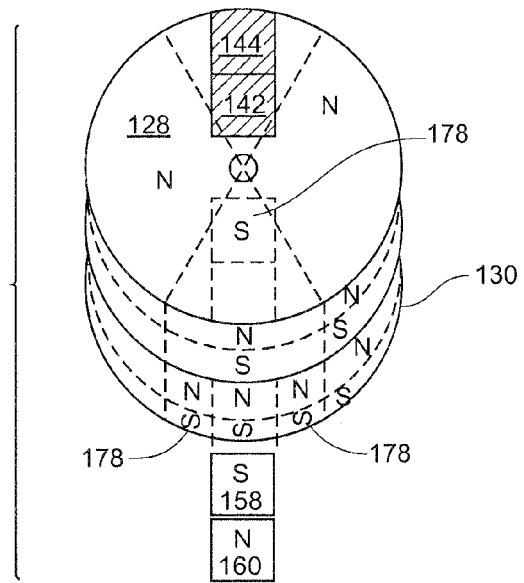
FIG. 14 shows a lower magnet section in an embodiment of the present teachings.

With additional reference to FIGS. 3 and 6, magnet blocks 154, 156, 158, and 160 can be placed in slots within wheel magnets 134 and 128 respectively. Magnet blocks 156 and 158 can be located near the center of wheel magnets 134 and 130 respectively where magnet blocks 156 and 158 will have identical polarities as wheel magnets 136 and 130 thus causing a dead center spot 178 (FIG. 14) in each of wheel magnets 134, 136, 128 and 130. Magnet blocks 156 and 158 and magnet wheels 128 and 136 will repel one another on the flat sides of the blocks 156 and 158 and wheels 128 and 136. The two sides of blocks 156 and 158 will have opposite polarities of magnet wheels 130 and 134, which will provide a magnetic attraction. This causes some magnetic flux to flow out of magnet wheels 130 and 134 to magnet blacks 156 and 158, which helps to "deaden" the top centers of magnet wheels 128 and 136. Dead center spot 178 is an area of reduced or no magnetic flux relative to the rest of magnetic section 14. Magnet blocks 154 and 160 can be located near the outer portions of wheel magnets 134 and 130 respectively. Magnet blocks 156 and 158 can pull magnetic energy from wheel magnets 136 and 128 respectively as their adjoining polarities are opposite and thus are attracted to one another. Magnet blocks 154 and 160 will have opposite polarities thus attracting one another on the flat side of blocks 154 and 160 and wheels 128 and 136. The two sides of block 154 and 160 will have the same polarities as magnet wheels 130 and 134 thus causing a dead area on each side of blocks 154 and 160. This will weaken the top part of wheel magnets 128 and 136.

Figure 15:
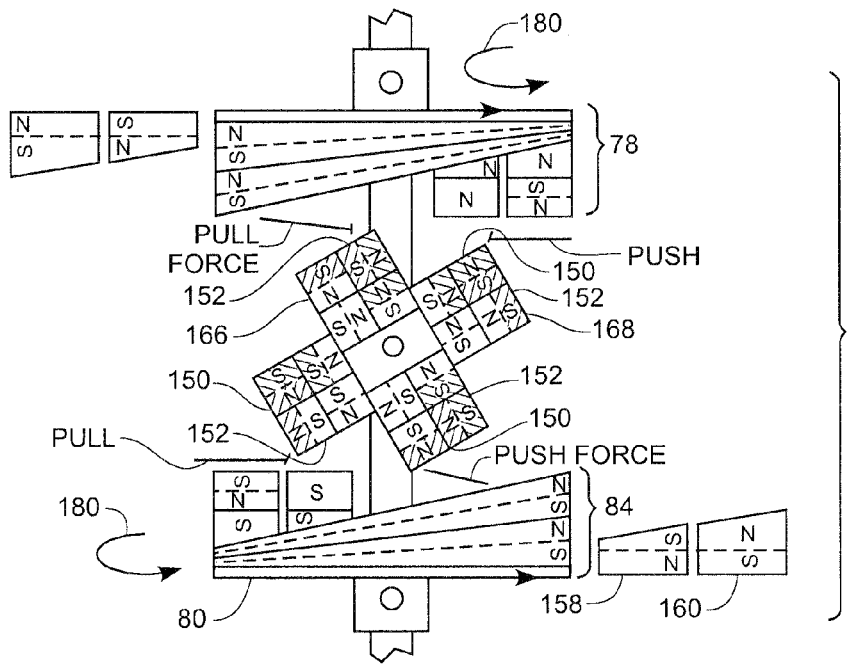
FIG. 15 shows a magnetic section of a electromagnetic motor/generator in an embodiment of the present teachings.
Figure 16:
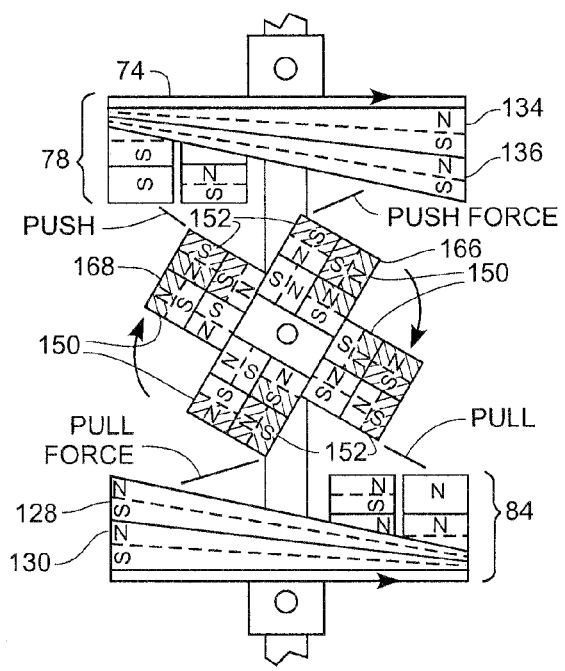
FIG. 16 shows a magnetic section of a electromagnetic motor/generator in an embodiment of the present teachings.

With reference to FIGS. 15 and 16, a magnetic section of an electromagnetic motor/generator in an embodiment of the present teachings is shown. In operation, an operator would toggle electrical switch 104 to apply power to micro switches 116 and 118, which in turn power solenoids 68 and 70. Upon receiving power, solenoids 68 and 70 begin to rotate center magnet section 36 downward approximately 45° as shown in FIG. 16 and upward approximately 45° as shown in FIG. 15. While the present teachings disclose using solenoids 68 and 70 to rotate center magnet section 36, it is fully contemplated that other devices such as motors, hand-cranks, and switches can be used to rotate center magnet section 36 without departing from the spirit of the present teachings. Pressure legs 150 and 152 allow for the 90° movement of center magnet 36. That is, as center magnet is rotated downward 45° one pressure leg 150 or 152 will be adjacent to upper magnets 78 and lower magnets 84, which will cause an attraction or repelling effect depending on the polarities of the pressure legs 150, 152 and upper magnets 78 and lower magnets 84. Now, center magnet can be rotated 45° in the upward direction (90 total) to cause another attraction or repelling effect, as will be described below.

As cross section 36 is rotated upward as shown in FIG. 15, magnetic flux from magnet sections 166 and 168 begin to engage magnetic flux from upper magnets 78 and lower magnets 84. North pressure leg 150 of section 168 comes in close proximity to the north pressure legs 150 of magnet blocks 144 and 142 in upper magnets 78. North pressure leg 150 of section 166 also comes into close proximity to the north pole of wheel magnet 128. These actions cause the north polarities to repel each other thus pushing upper magnets 78 and lower magnets 84 rotationally in the direction of arrows 180. North pressure leg 150 of section 168 also comes in close proximity to the south pressure leg 152 of magnet blocks 144 and 142 in lower magnets 84. North pressure leg 152 of section 166 also comes into close proximity to the south pole of wheel magnet 136. These actions cause the poles to attract each other thus pulling upper magnets 78 and lower magnets 84 rotationally towards magnet sections 166 and 168. Its notable that the bevel angle in magnet wheels 134, 136, 130, and 128 assist in the rotation of upper magnets 78 and lower magnets 84. That is, as the thicker and heavier parts of magnets 78 and 84 approach center magnet 36 the attraction and repelling forces will cause the thicker and heavier parts to pass by center magnet 36. The weight of the thicker parts will then give magnets 78 and 84 momentum to approach center magnet 36 again as magnets 78 and 84 circle around center magnet 36.

As cross section 36 is rotated downward as shown in FIG. 16, magnetic flux from magnet sections 116 and 168 again begin to engage magnetic flux from upper magnets 78 and lower magnets 84. South pressure leg 152 of section 168 comes in close proximity to the north pressure leg 150 of magnet blocks 144 and 142 in lower magnets 84. South pressure leg 152 of section 166 also comes into close proximity to the north pole of wheel magnet 128. These actions cause the poles to attract each other thus pulling upper magnets 78 and lower magnets 84 towards magnet sections 166 and 168. South pressure leg 152 of section 168 also comes in close proximity to the south pressure leg 152 of magnet blocks 144 and 142 in upper magnets 78. South pressure leg 152 of section 166 also comes into close proximity to the south pole of wheel magnet 136. These actions cause the poles to repel each other thus pushing upper magnets 78 and lower magnets 84 rotationally in the direction of arrow 180.

As solenoids 68 and 70 continue to cycle center magnet section 36 upward and downward, upper magnets 78 and lower magnets 84 will continue to rotate. As upper magnets 78 and lower magnets 84 continue to rotate, center axle 64 rotates as well due to center axle's attachment to upper magnets 78 and lower magnets 84. This rotation of center axle 64 can then be used as a motor to power a device or a generator to generate electricity. As shown in FIG. 1, electromagnetic motor/generator 10 is designed to generate electricity. Axle 64 is connected to pulley 96 which in turn connected to generator 102 by belt 100. As axle 64 turns, pulley 96 turns as well. Belt 100 then causes generator 102 to turn thus creating electricity. The present teachings provide for a magnetic motor/generator, which uses less energy than a typical motor/generator. By lifting center magnet with a small electrical charge energy can be saved thus making motors/generators more efficient.

Figure 17:
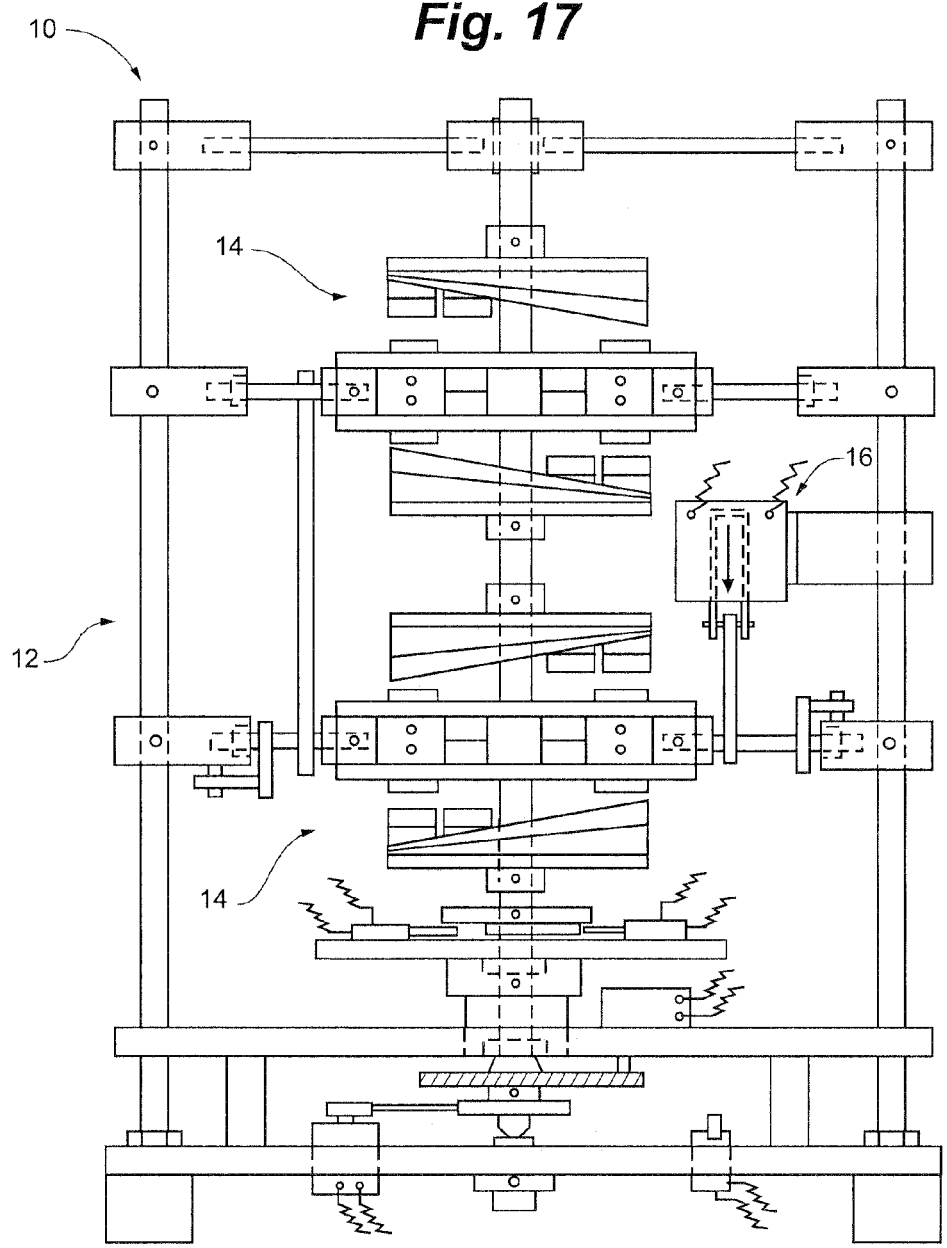
FIG. 17 shows a front elevated profile view of a magnetic motor/generator in an embodiment of the present teachings.

It is noted that electromagnetic motor/generator 10 requires very little electricity. The only electricity required is that required to power solenoids 68 and 70. It is also noted that electromagnetic motor/generator 10 has very few parts such as the frame 12, magnetic section 14, and solenoids 68 and 70. Electromagnetic motor/generator 10 can also be adapted to achieve desired results. For example, to achieve greater torque or power center magnet section could be rotated back and forth at a quicker speed using variable speed solenoids. In addition, larger magnets could be used or even a greater number of magnetic sections 14 as shown in FIG. 17.

Thus, embodiments of an ELECTROMAGNETIC MOTOR/GENERATOR are disclosed. One skilled in the art will appreciate that the present invention can be practiced with embodiments other than those disclosed. The disclosed embodiments are presented for purposes of illustration and not limitation, and the present invention is limited only by the claims that follow.

What is claimed is:

1. A generally rectangular magnetic block, comprising:
a first magnet having a north and a south pole;
a second magnet having a north and a south pole;
a third magnet having a north and a south pole;
a fourth magnet having a north and a south pole;
wherein each magnet is adjacent to two other magnets to form the generally rectangular_block having a center with 3 similar poles and one dissimilar pole.

2. The magnetic block of claim 1, wherein the 3 similar poles are north poles.

3. The magnetic block of claim 1, the four magnets being generally rectangular, the magnetic block having four outer corners formed from a portion of each of the four magnets, wherein the 3 similar poles of the center of the block are south poles, and wherein 3 of the outer corners include north poles.

4. The magnetic block of claim 1 wherein each of the four magnets forms a quadrant of the generally rectangular magnetic block, the north and south pole of each quadrant being oriented substantially perpendicular to the north and south poles of two adjacent quadrants, and the north and south pole of each quadrant being oriented substantially parallel to the north and south pole of the opposite quadrant.

5. The magnetic block of claim 4 wherein the generally rectangular magnetic block has four outer corners formed from each of the four magnets, three of the outer corners having similar poles.

6. A magnetic group, comprising:
a first magnet having a north and a south pole defining a first north-south axis;

a second magnet having a north and a south pole defining a second north-south axis;

a third magnet having a north and a south pole defining a third north-south axis; and a fourth magnet having a north and a south pole defining a fourth north-south axis;

the first and fourth north-south axes being substantially parallel to each other, the second and third north-south axes being substantially parallel to each other, and the first and fourth north-south axes being substantially perpendicular to the second and third north-south axes, the north pole of the first magnet being adjacent to the north and south pole of the third magnet, the north pole of the second magnet being adjacent to the north and south pole of the first magnet, the north pole of the fourth magnet being adjacent to the north and south pole of the second magnet, and the south pole of the third magnet being adjacent to the north and south pole of the fourth magnet.

7. The magnetic group of claim 6, wherein the poles of the magnets form an L shaped pressure leg.

8. The magnetic group of claim 7, wherein the L shaped pressure leg has a north pole and a south pole, the north and south poles oriented substantially perpendicular to each other about the magnetic group.

9. The magnetic group of claim 6, wherein each of the four magnets forms a quadrant of the magnetic group.

10. The magnetic group of claim 9 wherein the magnetic group is substantially rectangular.

11. The magnetic group of claim 10 wherein each of the four magnets is substantially rectangular, each magnet having a length that is substantially parallel to an axis of the magnetic group, and wherein the north-south axis of each of the four magnets is oriented substantially orthogonal to the axis of the magnetic group.

12. The magnetic group of claim 9 wherein the magnetic group forms a substantially rectangular block having four side faces and two end faces, each end face presenting an end portion of each of the four magnets, and each side face presenting one pole of one of the four magnets and both poles of another of the four magnets.

13. The magnetic group of claim 12 wherein two of the side faces of the rectangular block include adjacent similar poles, and two of the side faces of the rectangular block include adjacent dissimilar poles.

14. The magnetic group of claim 13 wherein the two side faces of the rectangular block having adjacent similar poles are disposed roughly 90 degrees from each other.

15. The magnetic group of claim 6 having a center portion comprising at least a portion of each of the four magnets, the center portion having three similar poles and one dissimilar pole.

16. The magnetic group of claim 15 further comprising four outer corners formed from a portion of each of the four magnets, three of the outer corners having similar polarity.

17. A method for manufacturing a magnetic block, comprising the steps of:

coupling magnetically a first magnet having a north and a south pole to a second magnet having a north and south pole;

coupling magnetically the first magnet having a north and a south pole to a third magnet having a north and south pole;

coupling magnetically a fourth magnet having a north and a south pole to the second magnet;

coupling magnetically a fourth magnet having a north and a south pole to the third magnet, wherein the poles of the magnets form an L shaped pressure leg, the L shaped pressure leg having a north pole and a south pole oriented substantially perpendicular to each other about the magnetic block, and wherein the north pole of the first magnet is adjacent to the north and south pole of the second magnet, the south pole of the second magnet is adjacent to the north and south pole of the fourth magnet, the south pole of the fourth magnet is adjacent to the north and south pole of the third magnet, and the south pole of the third magnet is adjacent to the north and south pole of the first magnet.

18. The method of claim 17, wherein the four magnets are arranged to form a magnetic group having a center with 3 similar poles and one dissimilar pole, and having four outer corners with 3 similar poles and one dissimilar pole.

* * * * *